United States Patent
Franzon et al.

(10) Patent No.: US 8,208,578 B2
(45) Date of Patent: Jun. 26, 2012

(54) SYSTEMS, METHODS, AND COMPUTER READABLE MEDIA FOR FRACTIONAL PRE-EMPHASIS OF MULTI-MODE INTERCONNECT

(75) Inventors: Paul D. Franzon, New Hill, NC (US); Yongjin Choi, San Ramon, CA (US); Chanyoun Won, Raleigh, NC (US); Hoon Seok Kim, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 164 days.

(21) Appl. No.: 12/820,113

(22) Filed: Jun. 21, 2010

(65) Prior Publication Data

US 2011/0310992 A1 Dec. 22, 2011

(51) Int. Cl.
*H04L 25/34* (2006.01)
*H04L 25/49* (2006.01)

(52) U.S. Cl. ..... 375/288; 375/286; 375/296; 455/114.2; 455/114.3; 455/501

(58) Field of Classification Search .................. 375/286, 375/288, 295, 296; 455/114.2, 114.3, 501
See application file for complete search history.

(56) References Cited

U.S. PATENT DOCUMENTS

| | | | |
|---|---|---|---|
| 6,556,628 B1 | 4/2003 | Poulton et al. | |
| 7,362,130 B2 | 4/2008 | Broyde et al. | |
| 2005/0089126 A1* | 4/2005 | Zerbe et al. | 375/353 |

OTHER PUBLICATIONS

Choi et al., "Analysis of Inter-Bundle Crosstalk in Multimode Signaling for High-Density Interconnects," IEEE, Electronic Components and Technology Conference, pp. 664-668 (2008).
Choi et al., "Multimode Signaling on Non-Ideal Channels," IEEE, pp. 51-54 (Copyright 2008).

* cited by examiner

*Primary Examiner* — Curtis Odom
(74) *Attorney, Agent, or Firm* — Jenkins, Wilson, Taylor & Hunt, P.A.

(57) ABSTRACT

Systems, methods, and computer readable media for fractional pre-emphasis of multi-mode interconnect are disclosed. According to one aspect, the subject matter described herein includes a method for fractional pre-emphasis of multi-mode interconnect. Multiple bits of binary data are periodically received. For each period, the multiple bits of binary data are encoded into multiple scalar values, each value representing a level of an analog signal to be output over a multi-mode interconnect system during the current period. Multiple analog signal outputs are generated corresponding to multiple scalar values, each signal output being driven to a level according to its corresponding scalar value. For each representative scalar value, a difference between the scalar value generated during the current period and the scalar value generated during the previous period is determined, and a pre-emphasis signal that is proportional to the difference is generated. Pre-emphasize each analog signal output according to the respective pre-emphasis signal, where the analog signal is pre-emphasized for a fraction of a period that is less than the entire period.

17 Claims, 6 Drawing Sheets

SYSTEMS, METHODS, AND COMPUTER READABLE MEDIA FOR FRACTIONAL PRE-EMPHASIS OF MULTI-MODE INTERCONNECT

TECHNICAL FIELD

The subject matter described herein relates to methods and systems for providing high-speed communication between electronic devices in a system, multichip module, printed circuit board, and the like. More particularly, the subject matter described herein relates to systems, methods, and computer readable media for fractional pre-emphasis of multi-mode interconnect.

BACKGROUND

An interconnect system is a system by which information is communicated between distinct entities, such as between computer chips on a printed circuit board (PCB) or multi-chip module (MCM). The term "interconnect", when used as a noun, refers to the medium by which the information is communicated. An interconnect may be an electrical connection, such as a wire or signal trace on a PCB or MCM, an optical connection, such as an optical fiber, or a wireless connection, such as a radio-frequency link. As used herein, however, the term "interconnect system" refers to a system that communicates information or data via a physical, electrical connection.

A binary interconnect system transmits information by imposing one of two possible states onto each interconnect. For example, a binary interconnect system may impose one of two voltages onto each interconnect, or may impose current through the interconnect, where the current is one of two levels or one of two directions. In a binary interconnect system, the two possible states may represent two logical values, e.g., 0 and 1. A multi-mode interconnect (MMI) system codes bits onto a set of levels distributed through a multi-channel interconnection, such as a wire bundle containing more than 2 wires.

However, there are disadvantages associated with multi-mode interconnect systems. One problem is that signals that travel down a real-world (not simulated) interconnect will suffer some signal loss. For example, a binary system which uses 0 volts to represent a logic 0 and 5 volts to represent a logic 1 may apply 5 volts to one end of a long interconnect, but due to impedance losses, the voltage at the other end of the long interconnect may be less than 5 volts, e.g., 3 volts, which is a 2-volt drop. A conventional solution to this kind of signal loss is to overdrive the source end of the interconnect, e.g., to 7 volts, so that even with the 2-volt drop across the interconnect, the voltage at the destination end of the interconnect is still 5 volts, i.e., still identifiable as a logic 1.

However, the amount of loss suffered may vary according to the frequency at which the signal is transmitted. For example, a 0-to-5 transition may have a short transition time at the driven end of the interconnect but a long transition time at the other end of the interconnect, with the result that the maximum rate at which the driven end of the interconnect may change state, e.g., the maximum frequency or data rate, is limited by the time that the signal takes to transition at the other end. A conventional solution to this kind of signal loss is to change the shape of the waveform at the source end of the interconnect, so that by the time the waveform arrives at the destination end of the interconnect, the shape of the waveform is such that the intended information can be identified or extracted. For example, if the slope of the rising edge of the signal applied to the source end of the interconnect can be made to be very steep, then by the time the signal arrives at the destination end, the transition time of the resulting waveform is not so long as to limit the frequency or data rate.

Although the techniques described above may work for binary interconnect systems, there are problems that arise when these techniques are applied to multi-mode interconnect systems which use a code word transmitted on a wire bundle to represent discrete data values. Conventional means to provide equalization require that succeeding bits get changed based on preceding values. This does not work for multi-mode interconnect systems, because multi-mode interconnect systems require a specific code word for each bit interval. For example, overdriving the voltage applied to the source end of the interconnect, as described in the first example, above, or changing the waveform to have a sharper slope, as described in the second example, above, both have the potential to change the value of the signal received by too much or too little, with the result that one or more of the received signals is incorrectly perceived to be a different voltage level than was intended, causing the code word that is received to be different from the code word that was transmitted.

Accordingly, in light of these disadvantages associated with conventional telecommunication networks that support mobile subscribers, there exists a need for systems, methods, and computer readable media for fractional pre-emphasis of multi-mode interconnect.

SUMMARY

According to one aspect, the subject matter described herein includes a system for fractional pre-emphasis of multi-mode interconnect. The system includes an encoder for receiving multiple bits of binary data in parallel and encoding the bits of binary data into multiple scalar values, each scalar value representing a level for a multi-level analog signal to be output over a multi-mode interconnect system during a current period. Multi-level drivers each receive one of the scalar values generated by the encoder for the current period and generate an analog signal output whose value corresponds to the respective scalar value received from the encoder. The system includes a latch for storing scalar values generated by the encoder during a previous period and a comparator module that receives from the encoder the scalar values generated for the current period and receives from the latch the scalar values generated for a previous period. For each respective scalar value, the comparator module generates a difference signal indicating the difference between the scalar value generated by the encoder for the current period and the scalar value generated by the encoder during the previous period. The difference signal is sent to a pre-emphasis module that provides fractional pre-emphasis to the analog signal outputs from the multi-level drivers. The pre-emphasis module applies an amount of pre-emphasis to each respective analog signal output according to the respective difference signal generated by the comparator module. The emphasis is provided to the analog signal outputs during a fraction of a period that is less than the whole period.

According to another aspect, the subject matter described herein includes a method for fractional pre-emphasis of multi-mode interconnect. Multiple bits of binary data are periodically received. For each period, the multiple bits of binary data are encoded into multiple scalar values, each value representing a level of an analog signal to be output over a multi-mode interconnect system during the current period. Multiple analog signal outputs are generated corresponding to multiple scalar values, each signal output being driven to a level according to its corresponding scalar value. For each representative scalar value, a difference between the scalar value generated during the current period and the scalar value generated during the previous period is determined, and a pre-emphasis signal that is proportional to the difference is generated. Pre-emphasize each analog signal output according to the respective pre-emphasis signal, where the analog signal is pre-emphasized for a fraction of a period that is less than the entire period.

The subject matter described herein for fractional pre-emphasis of multi-mode interconnect may be implemented in software, in combination with hardware and/or firmware. As such, the terms "entity" or "module" as used herein refer to software, in combination with hardware and/or firmware. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for fractional pre-emphasis of multi-mode interconnect.

Reference will now be made in detail to exemplary embodiments of the present invention, examples of which are illustrated in the accompanying drawings. Wherever possible, the same reference numbers will be used throughout the drawings to refer to the same or like parts.

Figure 1:
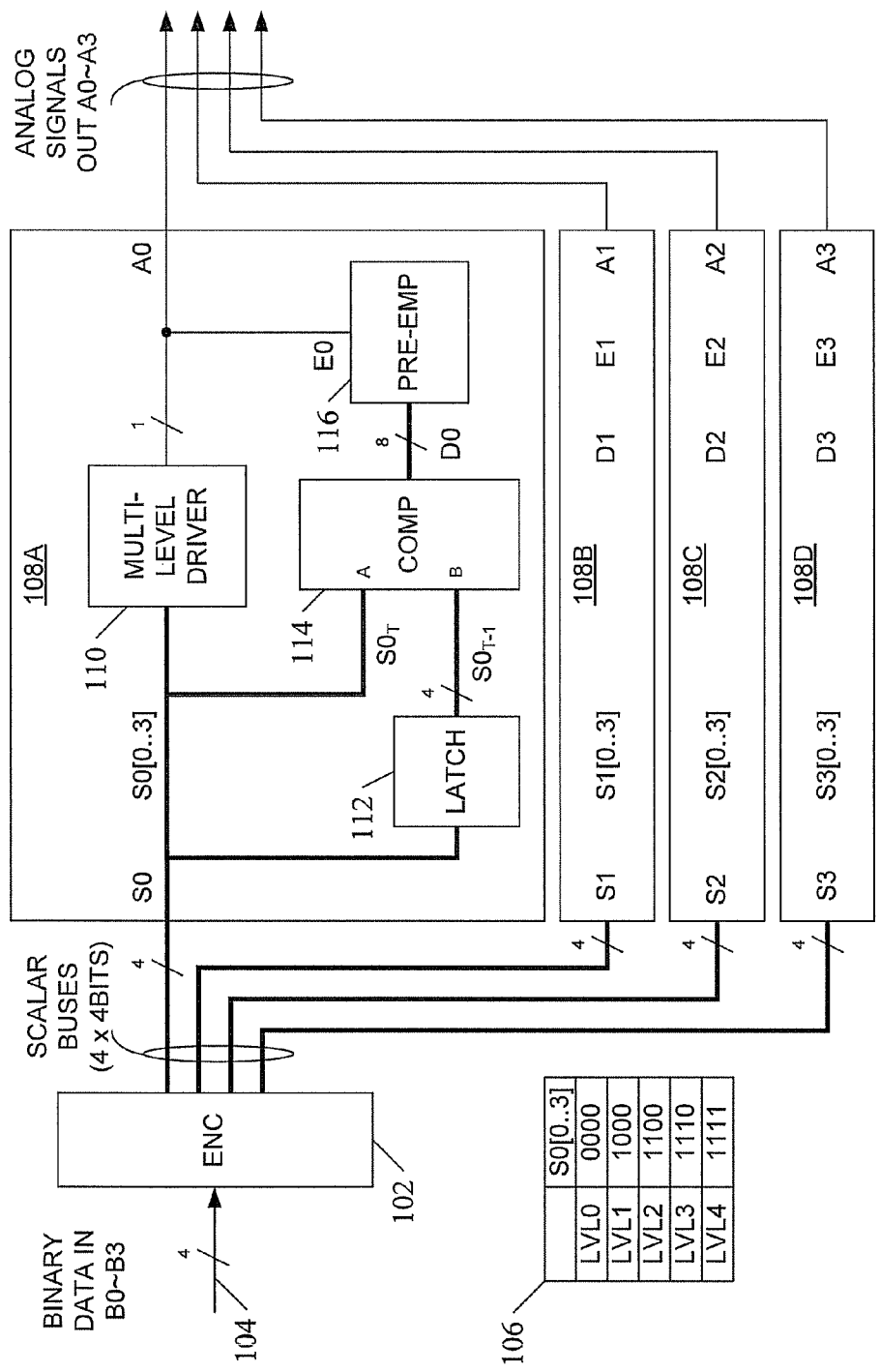
FIG. 1 is a block diagram illustrating an exemplary system for fractional pre-emphasis of multi-mode interconnect according to an embodiment of the subject matter described herein.

FIG. 1 is a block diagram illustrating an exemplary system for fractional pre-emphasis of multi-mode interconnect according to an embodiment of the subject matter described herein. System 100 includes an encoder 102 which periodically receives multiple bits of binary data in parallel from input data bus 104 and encodes the multiple bits of binary data into multiple scalar values. In the embodiment illustrated in FIG. 1, encoder 102 receives from four data bits B0 through B3 at a time from input data bus 104 and encodes the binary data to generate four scalars, S0 through S3. Each scalar represents a level for a multi-level analog signal to be output during the current period.

The following table illustrates an example encoding scheme according to an embodiment of the subject matter described herein:

TABLE 1

Example Encoding Scheme

| S0 = | !B0 + | B1 + | B2 + | B3 |
|------|-------|------|------|------|
| S1 = | !B0 + | B1 + | !B2 + | !B3 |
| S2 = | B0 + | B1 + | B2 + | !B3 |
| S3 = | B0 + | B1 + | !B2 + | B3 |

In Table 1, above, each of the scalars S0 through S3 are summations of the data bits B0 through B3 in different combinations. For example, if the input data on data bus 104 is "1110" in binary (B0=1, B1=1, B2=1, B3=0), the value of the scalars are shown in Table 2, below:

TABLE 2

Example Encoding Output for Input = "1110"

| | B0 | B1 | B2 | B3 | VALUE |
|---|----|----|----|----|-------|
| S0 = | 0 + | 1 + | 1 + | 0 = | 2 |
| S1 = | 0 + | 1 + | 0 + | 1 = | 2 |
| S2 = | 1 + | 1 + | 1 + | 1 = | 4 |
| S3 = | 1 + | 1 + | 0 + | 0 = | 2 |

As can be seen in Table 2, above, for a digital input of "1110", the four scalar values generated are S0=2, S1=2, S2=4, and S3=2. In the example encoding scheme shown in Table 1, above, each scalar S0 through S3 may take on any of the following values: 0, 1, 2, 3, or 4. In other words, this encoding scheme generates a multi-valued output, i.e., an output which may have one of five distinct levels, e.g., 0 through 4. These five distinct levels are hereinafter referred to as level 0 (abbreviated LVL0) through level 4 (abbreviated LVL4), respectively.

In one embodiment, the encoding scheme generates a set of scalar values such that the group of analog signal outputs make up a linear combination of fundamental modes for transmission through a group of tightly coupled lines or channels. In this way, the multiple bits of input are encoded such that N parallel signals are transmitted using only the fundamental modes of propagation, e.g., where N signals are transmitted by exciting all fundamental modes on a group of N closely coupled lines called a bundle.

In the embodiment illustrated in FIG. 1, each scalar S0 through S3 is represented as bits on a multi-bit scalar bus. For example, scalar S0 may be transmitted from encoder 102 on a 4-bit bus, scalar S1 may be transmitted on another 4-bit bus, scalar 52 may be transmitted via yet another 4-bit bus, and so on. Table 3, below, shows an example representation of how the possible scalar values (0, 1, 2, 3, and 4) may be coded for communication via a 4-bit bus according to an embodiment of the subject matter described herein, where the bits of the 4-bit bus that communicates scalar S0 are labeled S0[0], S0[1], S0[2], and S0[3], respectively:

TABLE 3

Example Representation of Scalar Values on a 4-bit Bus

| SCALAR VALUE | LEVEL | | S0[0] | S0[1] | S0[2] | S0[3] |
|---|---|---|---|---|---|---|
| 0 | LVL0 | = | 0 | 0 | 0 | 0 |
| 1 | LVL1 | = | 1 | 0 | 0 | 0 |
| 2 | LVL2 | = | 1 | 1 | 0 | 0 |
| 3 | LVL3 | = | 1 | 1 | 1 | 0 |
| 4 | LVL4 | = | 1 | 1 | 1 | 1 |

In Table 3, above, each scalar value LVL0 through LVL4 is uniquely coded onto bits S0[0 . . . 3] of the 4-bit bus. This table is also shown as table 106 in FIG. 1.

Each scalar S0 through S3 is sent to its own processing module 108A through 108D, respectively, herein collectively referred to processing modules 108. The processing modules generate multiple analog signal outputs A0 through A3 respectively. The processing modules 108 illustrated in FIG. 1 need not be physical modules, but may be a logical entities, each logical entity representing a collection of functions which are replicated multiple times. The 4-bit bus embodiment illustrated in FIG. 1 is not intended to be limiting; other architectures may be used to communicate the scalar values to their respective processing modules 108.

The operation of processing module 108A will now be described; the operation of processing modules 108B through 108D is similar. Processing module 108A includes a multi-level driver 110, which receives its respective scalar value, e.g., S0, that is generated by encoder 102 and generates an analog signal output, e.g., A0, whose value corresponds to the respective scalar value S0 received from encoder 102.

In the embodiment illustrated in FIG. 1, processing module 108A includes a latch 112 for storing the scalar value S0 generated by encoder 102 during the previous period, and a comparator module 114 for receiving both the scalar value generated by encoder 102 for the current period, $S0_T$, which comparator module 114 receives via input A, and the scalar value generated by encoded 102 for the previous period, $S0_{T-1}$, which comparator module 114 receives via input B and which is provided to comparator module 114 via the output of latch 112.

Comparator module 114 generates a difference signal D0 indicating the difference between the scalar value generated by the encoder for the current period and the scalar value generated by the encoder during the previous period. For example, if scalar value $S0_T$ is 4 but previous scalar value $S0_{T-1}$ is 1, difference signal $D0_T$ generated by comparator module 114 may have a value of 3, indicating that the current value jumped 3 levels from the previous value, e.g., from LVL1 to LVL4. If the next scalar value $S0_{T+1}$ is LVL2, then comparator module 114 may generate a difference signal $D0_{T+1}$ having a value of negative 2, indicating that the current value dropped 2 levels from the previous value, e.g., from LVL4 to LVL2.

Output D0 of comparator module 114 is sent to a pre-emphasis module 116 for providing fractional pre-emphasis to the analog signal output A0. Pre-emphasis module 116 generates a pre-emphasis signal E0 for analog signal output A0 based on difference signal D0 generated by comparator module 114. In one embodiment, emphasis signal E0 is provided to analog signal output A0 during a fraction of the period that is less than the whole period. In one embodiment, pre-emphasis module 116 has the ability to apply various strengths of pull-up (PU) or pull-down (PD) to analog signal output A0.

Figure 2:
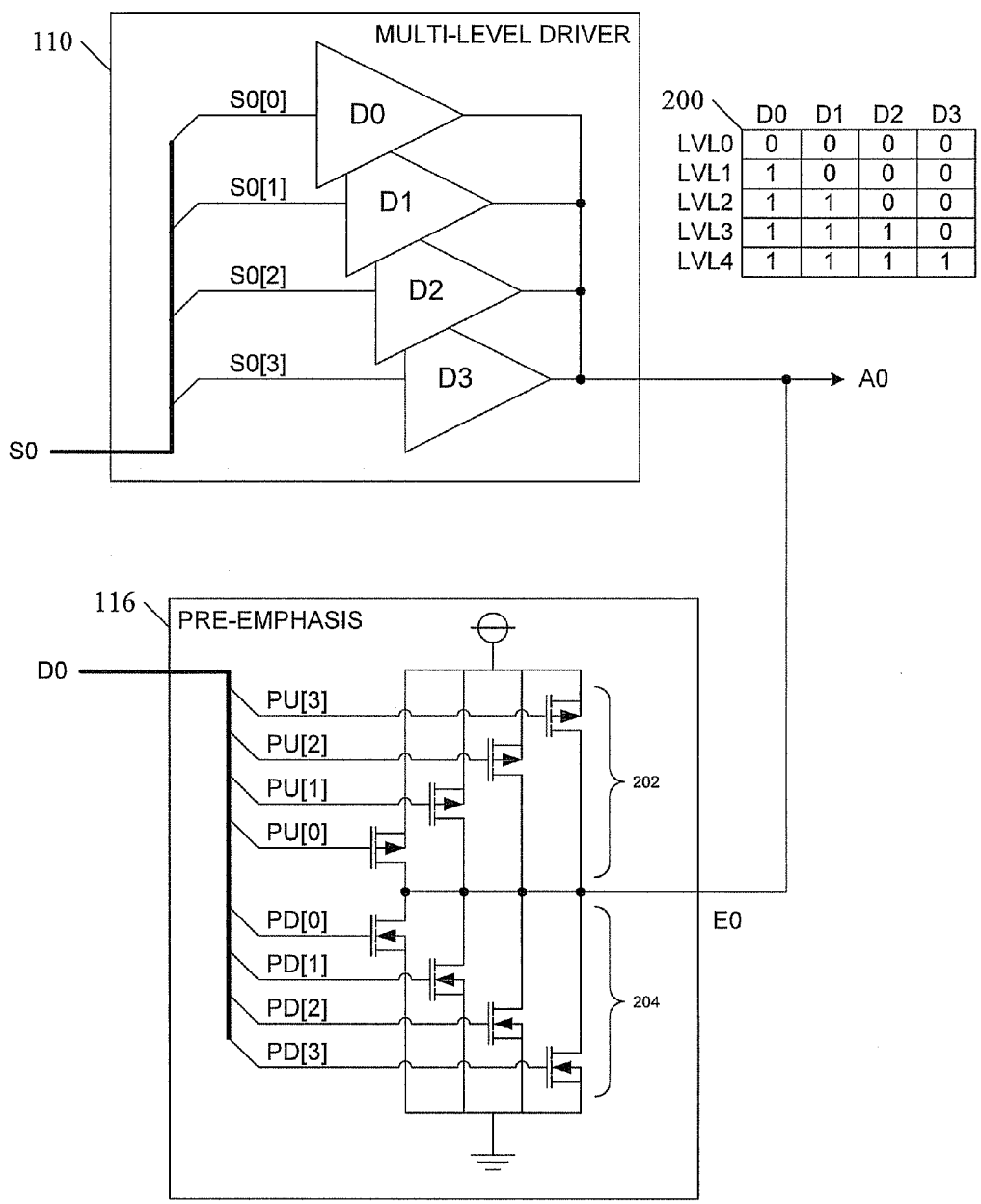
FIG. 2 is a block diagram illustrating in more detail a portion of representative processing module according to an embodiment of the subject matter described herein.

FIG. 2 is a block diagram illustrating in more detail a portion of representative processing module 108A according to an embodiment of the subject matter described herein. In FIG. 2, multi-level driver 110 receives its scalar value S0 that was generated by encoder 102 via a four-bit bus. Each of the four bits of bus are input into separate drivers. For example, bit S0[0] is the input to driver D0, bit S0[1] is the input to driver D1, and so on. The outputs of drivers D0, D1, D2, and D3 are connected together to create analog signal output A0. Table 200 shows the logical inputs to each of drivers D0 through D3 for each level LVL0 through LVL4.

In one embodiment, each driver produces an output corresponding to the logical input. For example, if bit S0[0] is a logical 0, driver D0 may output 0 volts, and if bit S0[0] is a logical 1, driver D0 may output 5 volts. In this embodiment, a driver that outputs 0 volts may be modeled by a resistor to ground voltage VSS and a driver that outputs 5 volts may be modeled by a resistor to the supply voltage VDD. The voltage that appears on A0 is therefore determined by a resistor ladder network. For example, if multi-level driver 110 is generating a LVL1 output value, D0 may be trying to drive 5 volts while D2, D2, and D3 may be trying to drive 0 volts. The resulting resistor ladder will generate an A0 voltage according to the formula:

$$A0 = R0/(R0 + R1 + R2 + R3) \times VDD$$

If the drivers are identical in structure, the output resistance of each driver will be approximately the same, and so the output voltage A0 becomes ¼×VDD. In this manner, LVL0=0× VDD; LVL1=¼×VDD; LVL2=½×VDD; LVL3=¾×VDD; LVL4=VDD, assuming VSS=0 volts. If, for example, VDD=5 volts and VSS=0 volts, LVL0=0V, LVL1=1.25V, LVL2=2.50V, LVL3=3.75V, and LVL4=5V.

FIG. 2 also illustrates in more detail pre-emphasis module 116. In the embodiment illustrated in FIG. 2, pre-emphasis module 116 includes pull-up transistors 202 and pull-down transistors 204. Each transistor is independently controlled by a corresponding bit of difference signal D0. In the embodiment illustrated in FIG. 2, D0 is an 8-bit bus, whose signal names are pull-up signals 0 through 3 (PU[0]~PU[3]) and pull-down signals 0 through 3 (PD[0]~PD[3].) In one embodiment, pull-down transistors 204 are N-channel MOS-FET (NMOS) devices, so pull-down signals PD[0]~PD[3] are high-active signals. Pull-up transistors 202 are P-channel MOSFET (PMOS), so pull-up signals PU[0]~PU[3] are low-active signals. An example operation of a processing module 108 is described in more detail in FIG. 4, below.

Figure 3:
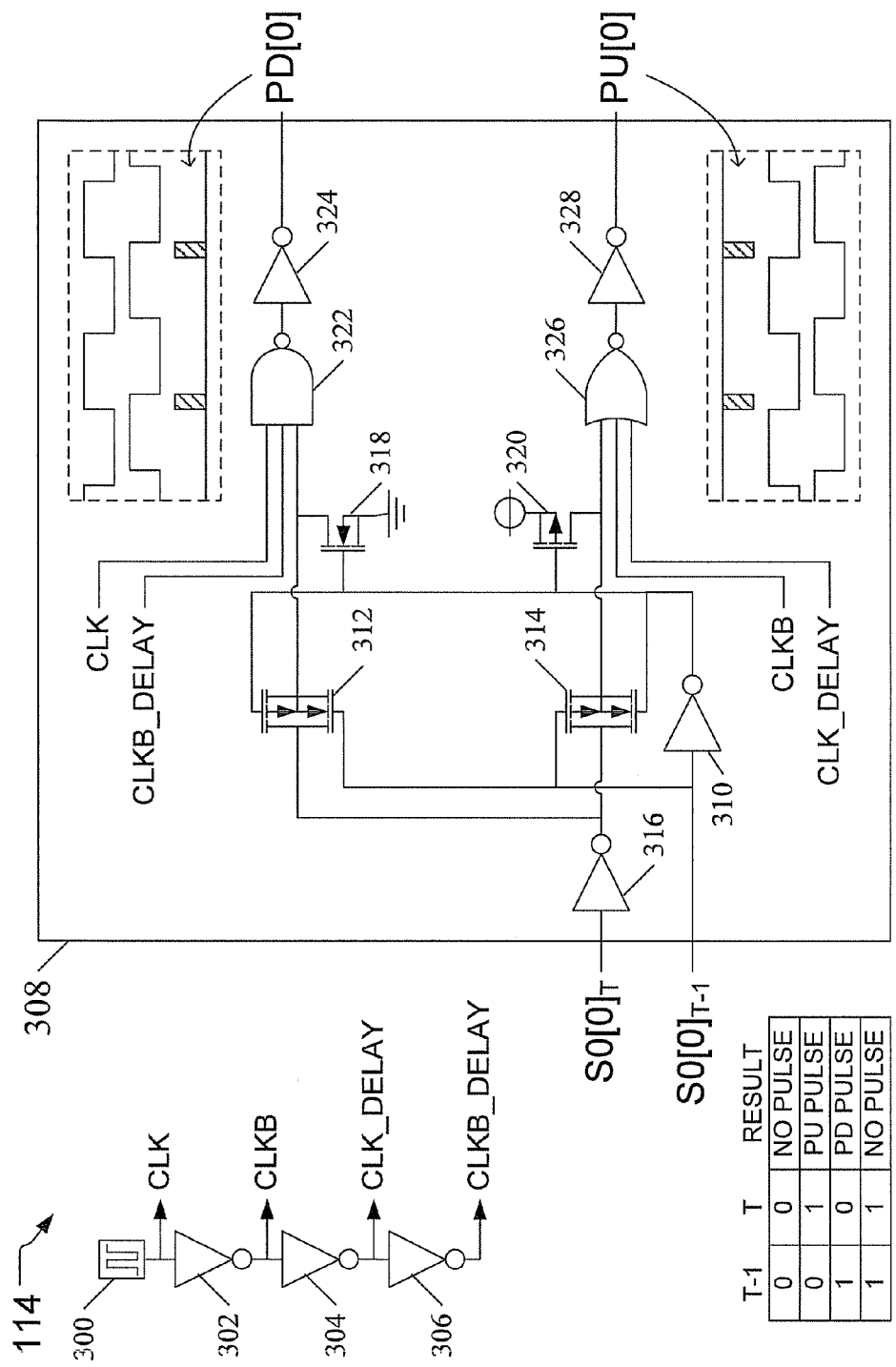
FIG. 3 is a block diagram illustrating in more detail a comparator module according to an embodiment of the subject matter described herein.

FIG. 3 is a block diagram illustrating in more detail a comparator module according to an embodiment of the subject matter described herein. In the embodiment illustrated in FIG. 3, comparator module 114 includes a clock source 300 and various inverters 302, 304, and 306, from which various clock signals are derived, including clock (CLK), inverted clock (CLKB), delayed clock (CLK_DELAY) and inverted delayed clock (CLKB_DELAY). In one embodiment, comparator module 114 includes a transition detection circuit 308 for each bit of the scalar bus. For simplicity, only one transition detection circuit 308 is shown in FIG. 3, the transition detection circuit 308 for bit 0 of scalar S0, i.e., S0[0]. In one embodiment, comparator module 114 contains identical transition detection circuits 308 for bits 1, 2, and 3 of scalar S0 as well, which are not shown in FIG. 3.

Transition detection circuit 308 receives as input both the current scalar value $S0[0]_T$ and the previous scalar value S0[O]$_{T-1}$ as inputs, and generates as outputs a pull-up signal PU[0] and a pull-down signal PD[0]. The previous scalar value S0[0]$_{T-1}$ along with its logical complement generated by inverter 310 control two transmission gates 312 and 314, each of which are formed by an NMOS transistor and PMOS transistor connected in parallel. Current scalar value S0[0]$_T$ complemented by inverter 316 and sent to both transmission gate 312 and transmission gate 314, but will pass through only one of the two transmission gates, depending on the value of previous scalar value S0[0]$_{T-1}$.

If S0[0]$_{T-1}$ is logic 0, transmission gate 312 is closed, pull-down NMOS transistor 318 is turned on, transmission gate 314 is open, and pull-up PMOS transistor 320 is turned off. Because transistor 318 is turned on, one input to a 3-input NAND gate 322 is tied to ground, effectively disabling the NAND gate by forcing its output to be logic 1, which is inverted by inverter 324 to become logic 0. The pull-down signal PD[0] can never go high, and the corresponding pull-down transistor within the pre-emphasis module 116 cannot turn on. However, if S0[0]$_T$ is logic 1, this means that there has been a 0-to-1 transition and a pull-up is desired. In this scenario, inverter 316 sends a logic 0 through open transmission gate 314 to a 3-input NOR gate 326 and inverter 328, with the result that the pull-up signal PU[0] goes low for a fraction of the clock period, providing the necessary pull-up pre-emphasis.

If S0[0]$_{T-1}$ is logic 1, on the other hand, transmission gate 312 is open, pull-down NMOS transistor 318 is turned off, transmission gate 314 is closed, and pull-up PMOS transistor 320 is turned on. Because transistor 320 is turned on, one input into 3-input NOR gate 326 is high, forcing the output of NOR 326 to be a logic 0, which is inverted by inverter 328 to become a logic 1. The pull-up signal PU[0] can not go low, and the corresponding pull-up transistor within pre-emphasis module 116 cannot turn on. However, if S0[0]$_T$ is logic 0, this means that there has been a 1-to-0 transition and a pull-down is desired. In this scenario, inverter 316 sends a logic 1 through open transmission gate 312 to 3-input NAND 322 and inverter 324, with the result that the pull-down signal PD[0] goes high for a fraction of the clock period, providing the necessary pull-down pre-emphasis. The detailed operation of the system in FIG. 1 will now be described with reference to FIG. 4.

Figure 4:
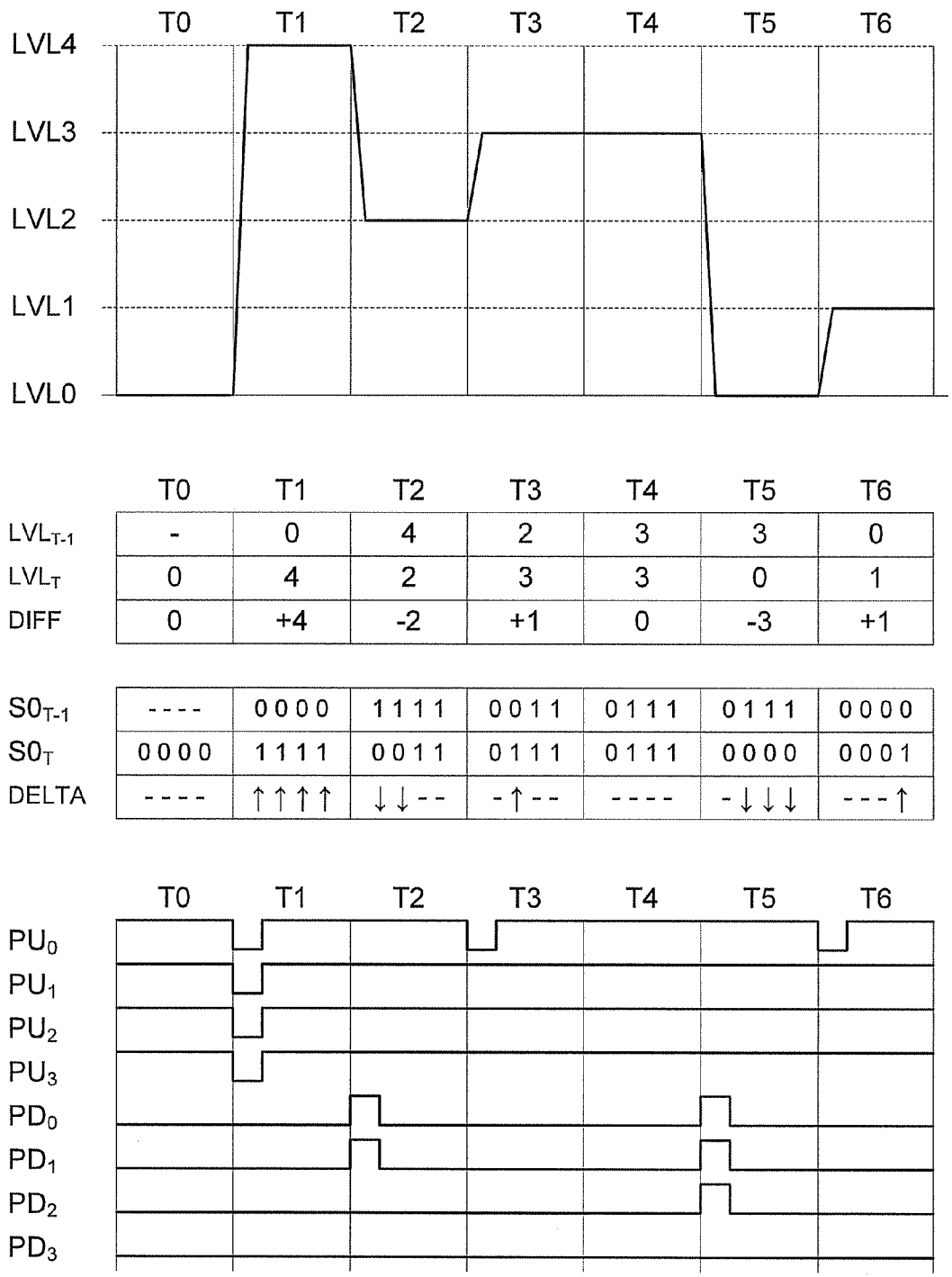
FIG. 4 describes the operation of an exemplary system for fractional pre-emphasis of multi-mode interconnect according to an embodiment of the subject matter described herein.

FIG. 4 describes the operation of an exemplary system for fractional pre-emphasis of multi-mode interconnect according to an embodiment of the subject matter described herein. FIG. 4 is a graph of events that occur during seven consecutive clock periods labeled T0 through T6, arranged from left to right across FIG. 4. The top portion of FIG. 4 illustrates an example analog signal output A0. During the first period, T0, multi-level driver 110 is driving an analog signal output level of LVL0. During the subsequent periods T1 through T6, multilevel driver 110 drives analog signal output levels of LVL4, LVL2, LVL3, LVL3 again, LVL0, and LVL1, in that order.

Below the graph of the analog signal output A0, FIG. 4 includes information for each period, listing the analog signal output level of the previous period (LVL$_{T-1}$), the analog signal output level of the current period (LVL$_T$), and the numerical change from the previous level to the current level (DIFF). Also for each period, FIG. 4 lists the previous value of the 4-bit scalar bus that was fed into multilevel driver 110 (S0$_{T-1}$), the current value of the 4-bit scalar bus that is fed into multilevel driver 110 (S0$_T$), and the bit-wise difference between the two (DELTA).

The bottom of FIG. 4 includes a graph showing example control signals that are generated by comparator module 114.

In the embodiment illustrated in FIG. 4, difference signal D0 generated by comparator module 114 is an 8-bit signal having four pull-up control signals (PU$_0$ through PU$_3$) and four pull-down control signals (PD$_0$ through PD$_3$).

Referring to period T0, multi-level driver 110 is driving LVL0. In this example, the previous level is unknown, so no action is taken by comparator module 114 or pre-emphasis module 116.

In period T1, multilevel driver is driving LVL4. The previously driven level is LVL0, for a difference of +4. In this scenario, the output level has changed significantly, from LVL0 to LVL4, and a significant amount of pull-up pre-emphasis is needed. Looking at the values present on S0$_{T-1}$ and S0$_T$, we see that the previous 4-bit value was "0000" and the current 4-bit value is "1111". The DELTA row indicates that all four of the 4-bit values changed, from a logic 0 to a logic 1, indicated in FIG. 4 as an up-arrow. As described above with regards to FIG. 3, comparator module 114 responds with a 0-to-1 transition by generating a fractional pull-up control signal. This is shown in FIG. 4, where all four of the pull-up control signals go low-active for a fraction of period T1. Because all four of the pull-up control signals are activated, all four of the pull-up transistors 202 within pre-emphasis module 116 are turned on, giving an extra boost to more quickly raise the voltage level of A0.

In period T2, multilevel driver 110 changes to LVL2, which is a difference of −2. Two bits of S0 have gone from a logic 1 to a logic 0, and two bits of S0 remain at logic 1. The 1-to-0 transition is indicated in the DELTA row by down-arrows, and a no-change condition is indicated in the DELTA row by a hyphen or dash. Comparator module 114 responds to a 1-to-0 transition by generating a fractional pull-down control signal. This is shown in FIG. 4, where two of the pull-down control signals, PD$_0$ and PD$_1$, go high-active for a fraction of period T2. Because only two of the four available pull-down control signals are activated, only two of the four available pull-down transistors 204 within pre-emphasis module 116 are turned on, giving an extra boost to more quickly lower the voltage level of A0. However, the additional pull-down applied in period T2 is only half as strong as the maximum pull-down that would occur if all four available pull-down transistors 204 had been activated.

In period T3, multilevel driver 110 goes up one level, from LVL2 to LVL3. This is indicated in the DIFF row, which shows a +1 for period T3. Only one bit of the 4-bit bus changed, from "0011" to "0111". This scenario calls for a relatively weak pull-up pre-emphasis, and comparator module 114 activates only one of the pull-up control signals, PU$_0$, for a fraction of period T3.

In period T4, there is no change in the level that multi-level driver 110 outputs, i.e., it remains at LVL3. Thus, DIFF=0, and DELTA shows that none of the bits of S0 have changed. Thus, in period T4, comparator module 114 does not activate any pull-up or pull-down control signals.

In period T5, the output of multi-level driver 110 drops three levels, from LVL3 to LVL0 (DIFF=−3), and three bits of S0 changed from 1 to 0 (DELTA shows three down arrows.) Comparator module 114 activates three pull-down control signals, PD$_0$, PD$_1$, and PD$_2$.

In period T6, the output of multi-level driver 110 rises one level, from LVL0 to LVL1 (DIFF=+1). One bit of S0 changed from 0 to 1 (DELTA shows one up arrow), so comparator module 114 activates just one pull-up control signal, PU$_0$.

Thus, it can be seen that in the embodiment illustrated in FIGS. 1, 2, and 3, comparator module 114 activates a number of pull-up or pull-down transistors within pre-emphasis module 116 in proportion to the number of levels that the analog output signal must change from one period to the next. If the analog output signal must go up four levels, four pull-up transistors are activated for a fraction of the period. If the analog output signal must go up only one level, only one pull-up transistor is activated for a fraction of the period. The same principle is applied to activate a number of pull-down transistors proportional to the number of levels that the output must drop from one period to the next.

In alternative embodiments, rather than having four equal strength pull-up or pull-down transistors, the transistors may have different sizes relative to each other. In this manner, a wider variety of pre-emphasis values may be applied. For example, by using sizes such as 1×, 2×, 4×, and 8×, for example, sixteen different strengths of pull-up or pull-down may be applied, from 0 (all transistors off) through 15 (all transistors on.) In such an embodiment, the scalar value generated by encoder 102 may be coded in binary on the scalar buses S0~S3, and comparator module 114 may perform a binary difference calculation rather than the simple bit-wise comparison described above.

In yet another embodiment, rather than adjusting the number of pull-up or pull-down transistors that are activated in proportion to the amount of pre-emphasis needed, the fraction or percentage of time which the pull-up or pull-down circuit is activated may be adjusted in proportion to the amount of pre-emphasis needed.

Figure 5:
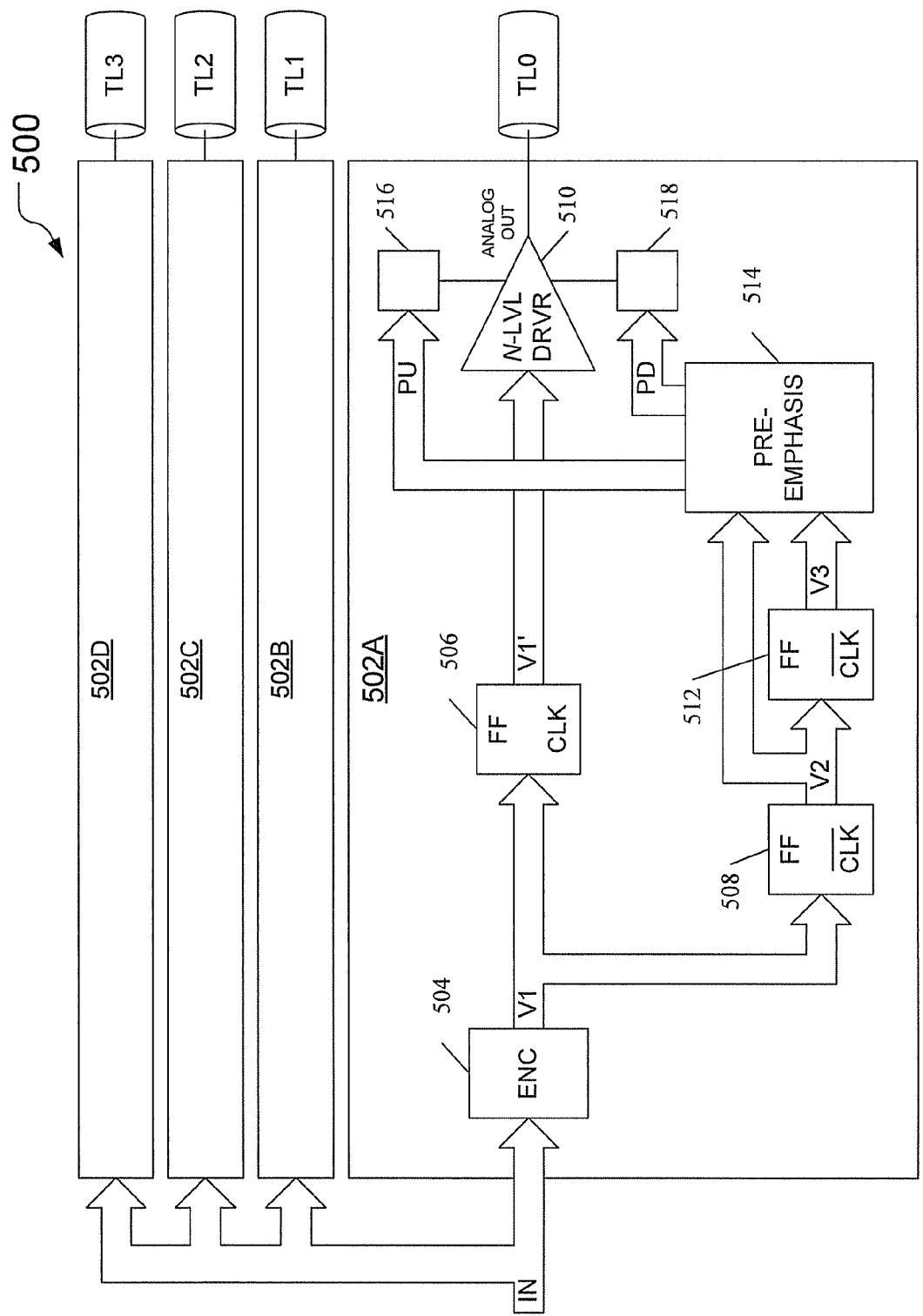
FIG. 5 is a block diagram illustrating an exemplary system for fractional pre-emphasis of multi-mode interconnect according to another embodiment of the subject matter described herein.

FIG. 5 is a block diagram illustrating an exemplary system for fractional pre-emphasis of multi-mode interconnect according to another embodiment of the subject matter described herein. System 500 receives input data IN, which may be multiple bits of binary data received in parallel or received serially and converted to parallel. Copies of input data IN are sent to each of multiple processor modules 502. In the embodiment illustrated in FIG. 5, input data IN is sent to four processor modules labeled 502A through 502D. Each of the processor modules 502 includes an encoder 504 that encodes the binary data into a scalar value V1. Scalar value V1 is clocked by positive edge flipflop 506 and also by a negative edge flipflop 508. Positive edge flipflop 506 generates output V1', which is the input to a multi-level driver 510, which generates an analog output signal onto transmission line TL0 that is proportional to the scalar value V1'. Thus, the analog output signals change on the rising edges of the clock signal CLK. Negative edge flipflop 508 generates output V2, which goes to negative edge flipflop 512 and also goes to pre-emphasis module 514.

Pre-emphasis module 514 receives the current scalar value V2 and the previous scalar value V3, calculates the difference between the two and determines whether pre-emphasis is needed, and how much. In the embodiment illustrated in FIG. 5, pre-emphasis module 514 generates pull-up control PU and pull-down control PD, which go to a pull-up module 516 and a pull-down module 518, respectively, which contain circuitry to help shape the output waveform generated by multi-level driver 510. In one embodiment, pull-up module 516 and pull-down module 518 may include one or more transistors to enhance the output of multi-level driver 510. In an alternate embodiment, pull-up module 516 and pull-down module 518 may modify the power supply to multi-level driver 510.

One way that system 500, which illustrated in FIG. 5, differs from system 100, which is illustrated in FIG. 1, is that system 100 has one encoder 102 whose output scalars S0~S3 are distributed to each processing module 108, while system 500 has multiple processing modules 502 that each have their own encoder 504. Implementation of fractional pre-emphasis of multi-mode interconnect is not limited to the embodiments illustrated in FIGS. 1 and 5, but may be implemented in other ways. For example, fractional pre-emphasis of multi-mode interconnect may be implemented using clockless logic or using a different clocking design; different numbers of modes or levels generated by the multi-level driver may be used; input data may be parallel data of more or less than four bits and may even be serial data that is converted to parallel by the encoder prior to the encoding process; different numbers of interconnect data channels or transmission lines may be used; different multi-mode encoding may be used; and so on.

Figure 6:
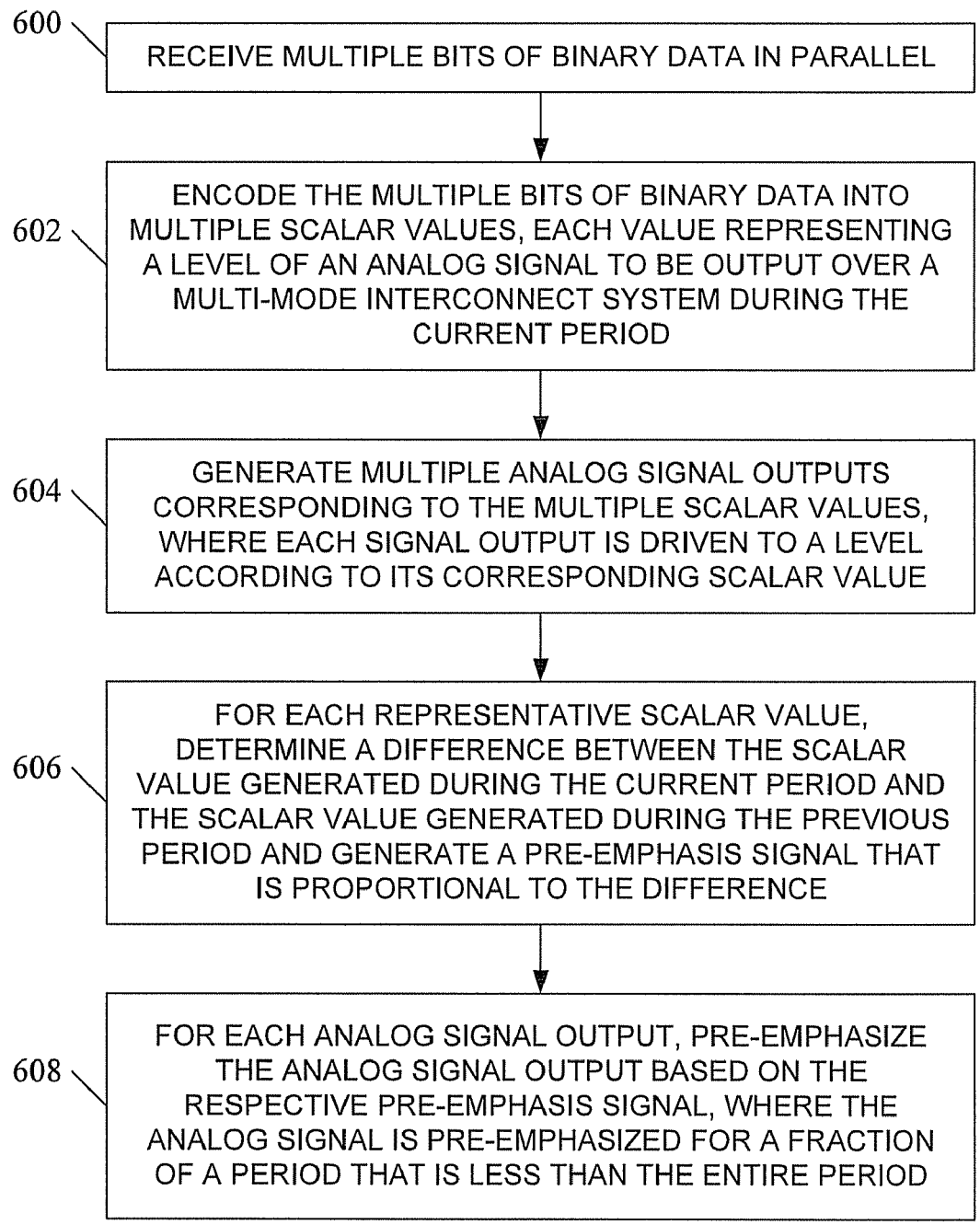
FIG. 6 is a flow chart illustrating an exemplary process for fractional pre-emphasis of multi-mode interconnect according to an embodiment of the subject matter described herein.

FIG. 6 is a flow chart illustrating an exemplary process for fractional pre-emphasis of multi-mode interconnect according to an embodiment of the subject matter described herein. The process will now be described with reference to FIGS. 6 and 1.

At block 600, multiple bits of binary data are received in parallel. For example, in system 100, encoder 102 receives four bits of binary data B0~B3 in parallel.

At block 602, the multiple bits of binary data are encoded into multiple scalar values, each value representing a level of an analog signal to be output over a multi-mode interconnect system during the current period. For example, encoder 102 may encode the four bits of binary data into four separate scalar values, where each scalar value represents the level of an analog signal output to be transmitted along one channel or trace of a multi-mode interconnect.

At block 604, multiple analog signal outputs corresponding to the multiple scalar values are generated, where each signal output is driven to a level according to its corresponding scalar value. For example, multi-level driver 110 may receive its corresponding scalar value S0 and generate an analog signal output proportional to the scalar value. In one embodiment, the scalar value may represent a voltage to which the analog output signal is to be driven. In another embodiment, the scalar value may represent a current which is to flow along the channel or signal path of a multi-mode interconnect system.

At block 606, a difference between the scalar value generated during the current period and the scalar value generated during the previous period is determined for each scalar value, and a pre-emphasis signal is generated that is proportional to the difference. For example, in the embodiment illustrated in FIG. 1, difference signal D0 may be a bit-wise comparison of the two scalar values, showing for each bit whether the bit value changed from 0 to 1, changed from 1 to 0, or did not change. In another embodiment, the difference signal may be the result of a mathematical operation, such as subtracting the current scalar value from the previous scalar value, where a positive result indicates an increase from the previous scalar value up to the current scalar value and a negative result indicates a decrease from the previous scalar value down to the current scalar value.

At block 608, for each analog signal output, the analog signal output from the multi-level drivers is pre-emphasized based on the respective pre-emphasis signal. The analog signal is pre-emphasized for a fraction of a period that is less than the entire period. For example, in the embodiment illustrated in FIG. 1, analog signal output A0 may be shaped by pull-up and pull-down transistors within pre-emphasis module 116 whose drains are connected to A0 via signal path E0. In one embodiment, the strength of the pull-up or pull-down circuit may be proportional to the difference calculated at block 606. Alternatively, the duration of the pre-emphasis signal, i.e., the fraction or portion of the period during which analog signal output A0 is pre-emphasized, may vary proportional to the difference calculated at block 606.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for fractional pre-emphasis of multi-mode interconnect, the system comprising:
   an encoder for receiving a plurality of bits of binary data in parallel and encoding the plurality of bits of binary data into a plurality of scalar values, each scalar value representing a level for a multi-level analog signal to be output over a multi-mode interconnect system during a current period;
   a plurality of multi-level drivers, each for receiving a respective one of the plurality of scalar values generated by the encoder for the current period and for generating an analog signal output whose value corresponds to the respective scalar value received from the encoder;
   a latch for storing the plurality of scalar values generated by the encoder during a previous period;
   a comparator module for receiving from the encoder the plurality of scalar values generated by the encoder for the current period, for receiving from the latch the plurality of scalar values generated by the encoder during the previous period, and for each respective scalar value, generating a difference signal indicating the difference between the scalar value generated by the encoder for the current period and the scalar value generated by the encoder during the previous period; and
   a pre-emphasis module for providing fractional pre-emphasis to the analog signal outputs from the multi-level drivers, wherein the pre-emphasis for each respective analog signal output is based on the respective difference signal generated by the comparator module, and wherein the emphasis is provided to the analog signal outputs during a fraction of a period that is less than the whole period.

2. The system of claim 1 wherein the encoder encodes the plurality of bits of binary data into the plurality of scalar values such that the plurality of analog signal outputs comprise a linear combination of fundamental modes for transmission through a plurality of tightly coupled channels.

3. The system of claim 1 wherein each scalar value is represented as a plurality of bits.

4. The system of claim 3 wherein the comparator module comprises a transition detector which determines how many bits of the scalar value generated by the encoder for the current period have changed from their corresponding bits of the scalar value that was generated by the encoder for a previous period and wherein the difference signal generated by the comparator module represents the number of bits that have changed.

5. The system of claim 1 wherein the pre-emphasis module includes a plurality of pull-up transistors for driving the value of the analog signal outputs towards a first supply voltage and a plurality of pull-down transistors for driving the value of the analog signal outputs towards a second supply voltage, where the second supply voltage is lower than the first supply voltage.

6. The system of claim 5 wherein a number of the plurality of pull-up or pull-down transistors are activated based on the value of the difference signal generated by the comparator module.

7. The system of claim 1 wherein the fraction of the period during which the pre-emphasis module provides pre-emphasis to the analog signal output is based on the value of the difference signal generated by the comparator module.

8. The system of claim 1 wherein the strength of the pre-emphasis signal that is provided by the pre-emphasis module during the fraction of the period during which the pre-emphasis module provides pre-emphasis is based on the value of the difference signal generated by the comparator module.

9. A method for fractional pre-emphasis of multi-mode interconnect, the method comprising:
   periodically receiving a plurality of bits of binary data in parallel, and for each period:
   encoding the plurality of bits of binary data into a plurality of scalar values, each value representing a level of an analog signal to be output over a multi-mode interconnect system during a current period;
   generating a plurality of analog signal outputs corresponding to the plurality of scalar values, each signal output being driven to a level according to its corresponding scalar value;
   for each representative scalar value, determining a difference between the scalar value generated during the current period and the scalar value generated during the previous period and generating a pre-emphasis signal that is proportional to the difference; and
   for each analog signal output, pre-emphasizing the analog signal output according to the respective pre-emphasis signal, wherein the analog signal is pre-emphasized for a fraction of a period that is less than the entire period.

10. The method of claim 9 wherein encoding the plurality of bits of binary data into a plurality of scalar values comprises encoding the plurality of bits into a plurality of scalar values such that the plurality of analog signal outputs corresponding to the plurality of scalar values comprise a linear combination of fundamental modes for transmission through a plurality of tightly coupled channels.

11. The method of claim 9 wherein each scalar value is represented as a plurality of bits.

12. The method of claim 11 wherein determining a difference between the scalar value generated during the current period and the scalar value generated during the previous period includes determining how many bits of the scalar value encoded for the current period have changed from their corresponding bits of the scalar value encoded for a previous period and wherein the difference signal represents the number of bits that have changed.

13. The method of claim 9 wherein pre-emphasizing the analog signal output according to the respective pre-emphasis signal includes using a plurality of pull-up transistors for driving the value of the analog signal outputs towards a first supply voltage and a plurality of pull-down transistors for driving the value of the analog signal outputs towards a second supply voltage, where the second supply voltage is lower than the first supply voltage.

14. The method of claim 13 wherein a number of the plurality of pull-up or pull-down transistors are activated based on the value of the respective pre-emphasis signal.

15. The method of claim 9 wherein the fraction of the period during which the analog signal is pre-emphasized is based on the value of the respective pre-emphasis signal.

16. The method of claim 9 wherein the strength of the pre-emphasis applied to the analog signal output is based on the value of the respective pre-emphasis signal.

17. A non-transitory computer readable medium having stored thereon executable instructions that when executed by the processor of a computer control the computer to perform steps comprising:

periodically receiving a plurality of bits of binary data in parallel, and for each period:

encoding the plurality of bits of binary data into a plurality of scalar values, each value representing a level of an analog signal to be output over a multi-mode interconnect system during a current period;

generating a plurality of analog signal outputs corresponding to the plurality of scalar values, each signal output being driven to a level according to its corresponding scalar value;

for each representative scalar value, determining a difference between the scalar value generated during the current period and the scalar value generated during the previous period and generating a pre-emphasis signal that is proportional to the difference; and for each analog signal output, pre-emphasizing the analog signal output based on the respective pre-emphasis signal, wherein the analog signal is pre-emphasized for a fraction of a period that is less than the entire period.

* * * * *